United States Patent

[11] 3,574,274

| [72] | Inventors | Arthur J. Little<br>Springfield;<br>William R. Mayer, Rochester, Ill. |
|---|---|---|
| [21] | Appl. No. | 821,876 |
| [22] | Filed | May 5, 1969 |
| [45] | Patented | Apr. 13, 1971 |
| [73] | Assignee | Stewart-Warner Corporation<br>Chicago, Ill. |

[54] SOLID-STATE HOUR METER
7 Claims, 6 Drawing Figs.

[52] U.S. Cl. .................................................... 58/23,
58/145
[51] Int. Cl. ..................................................... G04c 3/00
[50] Field of Search .......................................... 58/1, 2, 3,
23, 145—147, 39.5

[56] References Cited
UNITED STATES PATENTS

| 3,299,627 | 1/1967 | Hart et al. ..................... | 58/39.5 |
| 3,418,802 | 12/1968 | Little et al. ................... | 58/23 |

Primary Examiner—Richard B. Wilkinson
Assistant Examiner—Edith C. Simmons
Attorneys—Augustus G. Douvas, William J. Newman and Norton Lesser ABSTRACT: The following specification describes an hour meter assembly utilizing a solid-state circuit applying appropriately timed pulses to a coil capable of driving the meter dials with portions of the coil magnetic circuit and terminals supplying electrical power to the circuit serving to locate and secure an assembly of the solid-state circuit and dials in a meter case.

PATENTED APR 13 1971
3,574,274
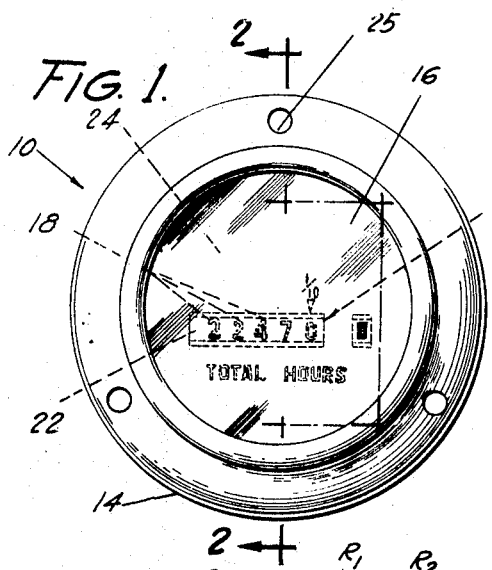
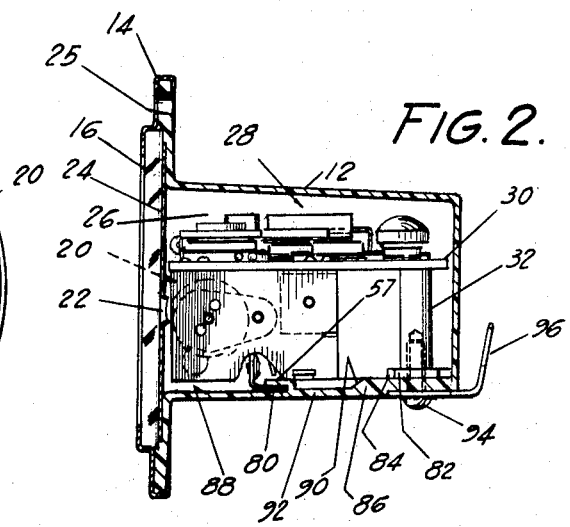
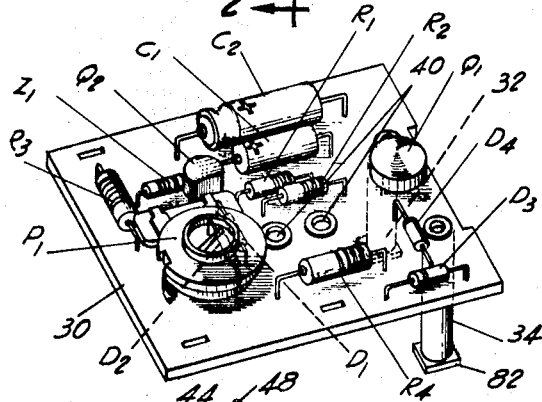
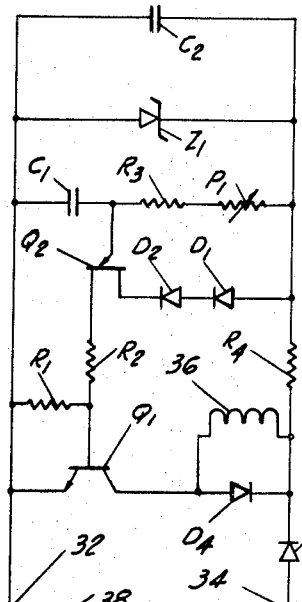
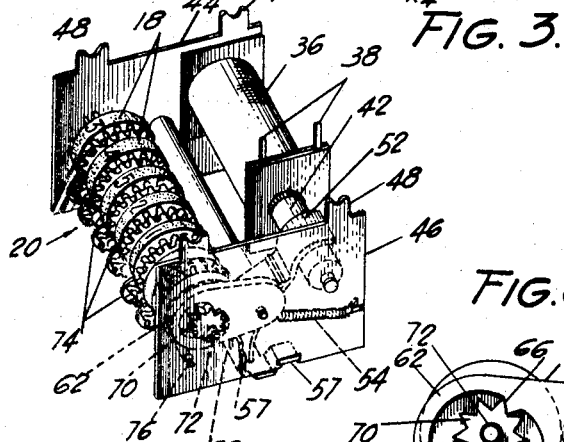
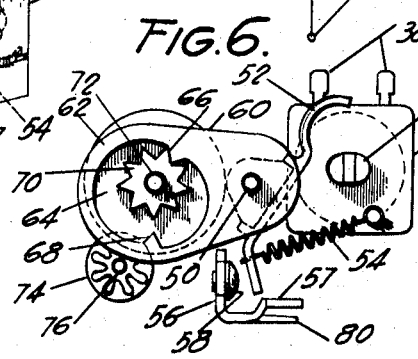
INVENTORS
ARTHUR J. LITTLE
WILLIAM R. MAYER
By Norton Lesser
ATTORNEY

SOLID-STATE HOUR METER

DESCRIPTION OF THE INVENTION

1. Field of the Invention

The present invention relates in general to solid-state hour meters and more particularly to a stable economical solid-state timing circuit for driving conventional hour meter dials together with the mounting and support of the circuit, driving assembly and conventional dials in an hour meter case.

2. Description of the Prior Art

Problems in the adaptation of solid-state circuits for use in hour meters arise from the use of hour meters in environments subject to considerable variations in ambient temperatures and supply voltages, and under considerable vibratory stress. It is therefore necessary to provide a circuit which operates stably under such conditions, but at the same time it is necessary to render the circuit and its attendant physical structure both economical and compatible with existing hour meter apparatus.

SUMMARY OF THE INVENTION

To overcome the above problems, the present invention utilizes a unijunction transistor controlled by a simple RC circuit. One base circuit of the unijunction is connected to the base circuit of an NPN transistor whose base circuit is connected in series with a solenoid coil to the power supply and the other base circuit of the unijunction is connected to a pair of serially connected diodes for temperature compensation. A Zener diode and capacitor are connected across the RC circuit to stabilize the voltage applied thereto. With the exception of the solenoid coil, the described components are all mounted on a small printed circuit board.

The solenoid drives dials arranged in close and parallel spacing to the axis of the solenoid coil for indicating elapsed time and all are supported between a pair of spaced plates. The solenoid utilizes a simple pivotable-type armature together with a unique magnetic circuit arrangement including only one of the spaced plates that facilitates power transmission for driving the coils in the space and configuration limitations involved. The spaced plates are located directly beneath the printed circuit board with electrical connections to the solenoid coil completed through the board and the plates and board serve to mutually support and locate each other in an hour meter housing or case. Supporting studs on the board serve to both support the assembly and extend electrical connections thereto from external the housing, while portions of the solenoid magnetic circuit contribute to the locating and supporting functions.

Accordingly, one object of the present invention is to provide an improved and economical solid-state hour meter.

Another object of the invention is to provide a solid-state hour meter which is economically adapted for use with conventional hour meter components.

DESCRIPTION OF THE DRAWINGS

FIG. 1 is a front elevational view of an hour meter assembly utilizing the principles of the present invention;

FIG. 2 is a sectional view taken along the line 2—2 in FIG. 1;

FIG. 3 is a top isometric view of the printed circuit board assembly utilized in the present invention;

FIG. 4 is a top isometric view of the solenoid and dial assembly;

FIG. 5 is a circuit diagram illustrating the circuit connections utilized in the invention; and FIG. 6 is a side elevational view of the solenoid and dial assembly with the support plates omitted.

PREFERRED EMBODIMENT OF THE INVENTION

In FIG. 1 an hour meter is indicated therein by the reference character 10. The hour meter comprises a cup-shaped housing 12, best seen in FIG. 2, having a peripheral rim at one end on which a bezel 14 is mounted. The bezel 14 defines a circular opening in which a glass 16 is disposed to permit viewing of a series of dials 18 of a dial assembly 20. The dials 18 are viewed through a window 22 formed in a plate 24 directly behind the glass. Openings 25 may be provided in the bezel and rim or a conventional backwall stud and U-shaped bracket (not shown) may be used to mount the hour meter on a panel. The housing 12 is generally cup-shaped and defines a cavity 26 for receiving a printed circuit board assembly 28 and the dial assembly 20 in cavity 26.

The printed board assembly 28 comprises an electrically insulating board 30, best seen in FIG. 3, approximately 2 inches long and 1¾ inches wide. The board 30 has circuit connections on the lower side thereof formed in a conventional manner to effectuate the circuit arrangement shown in FIG. 5, and carries a plurality of circuit elements shown in FIGS. 3 and 5. Those circuit elements include an NPN type 2N3567 diffused silicon planar epitaxial transistor Q1, a unijunction transistor Q2, a resistor R1 connected between the base circuit of Q1 to a supporting stud 32 connected directly to the emitter circuit of Q1, and a resistor R2 connecting the base circuit of Q1 to one base circuit of unijunction Q2. The board also carries a capacitor C1 connected between the emitter circuit of Q2 and stud 32, a resistor R3 connected between the emitter circuit of Q2 and one terminal of a variable resistor or potentiometer P1, which is located somewhat above the board to physically accommodate therebeneath a pair of diodes D1 and D2 serially connected between the other base circuit of Q2 and the other terminal of potentiometer P1. Also carried by board 30 are a Zener diode Z1 to bypass higher than desired voltages and capacitor C2 each connected between the other terminal of P1 and stud 32, a resistor R4 connected from the common junction of potentiometer P1, diode Z1 and capacitor C2 through a diode D3 adapted to pass positive battery to a second supporting stud 34. Another diode D4, carried by board 30, is connected between the juncture of diode D3 and resistor R4 to the collector circuit of Q1 in shunt with a 35-ohm coil 36 of the assembly 20. The coil 36 is located beneath the board and is connected to the collector circuit of Q1 and diode D3 by means of a pair of tabs 38 each engaged with a respective eyelet 40 and fixed on board 30.

The coil 36 is supported on a core or pole piece 42 fixed between a magnetically susceptible or soft iron plate 44 and a brass or nonmagnetic plate 46. The plates 44 and 46 each have tabs 48 staked to the board 30. A plastic rod 50 pivotally supported between the plates 44 and 46 carries a radially extending armature 52 for pivotal movement of one armature end toward the pole piece 42. By placing the armature pivot between the armature ends, a counterbalance effect is achieved to avoid inadvertent operation through vibration or shock and reduce wear. A coil spring 54 connected to the other end of the armature biases the armature 52 from the pole piece and the opposite end from a second pole piece 56. Pole piece 56 is L-shaped in cross section and each leg has a tang 57 thereon staked to the plates 44 and 46. The bottom or horizontal leg of pole piece 56 is spaced adjacent an adjacent end of armature 52 while the other or vertical leg is spaced adjacent the major armature area to provide an efficient magnetic circuit for the armature with the vertical leg of pole piece 56 carrying a residual element 58 to avoid magnetic sticking.

A plastic actuator 60 is staked to armature 52 for rotation therewith in response to rotational movement of the armature. The actuator 60 has an enlarged extending arm 62 in which opening 64 is formed having a pair of spaced radially inwardly extending teeth 66 and 68. A 10-tooth star wheel 70 is located in the opening 64. The wheel 70 is mounted on a shaft 72 coaxial with the series of dials 18 each assigned a successive digit order and marked with indicia 0—9 along the periphery thereof for viewing through the window 22. A series of pinion gears 74 on shaft 76 and located between respective pair of dials 18 serve to transfer incremental movement from a lower digit order dial to the successive higher digit order dial through gear teeth formed on respective sides of each dial, all in a conventional manner.

In order to properly position and locate the assemblies 20 and 28 in cavity 26, a lip 80 is formed on lower leg of pole piece 56 and a flange 82 is formed along the bottom of each stud 32 and 34. The studs are internally threaded and the flange on each flange 82 is received in a respective guideway 84 formed on a platform 86 on the lower wall surface of cavity 26. A ramp 90 is provided to engage the flanges and raise the same as the assemblies are moved rearwardly in the cavity along the bottom wall while a forwardly extending central rib 92 on the bottom wall positions the assemblies and studs. A recess at the end of the rib 92 receives the lip 80, and overlapping flanges on the rib prevent the lip 80 from moving vertically. Respective screws 94, threaded into the studs and carrying respective electrical terminals 96, fasten the dial and board assemblies 20 and 28 in position in the housing and extend positive battery terminal to the diode D3 and negative battery terminal to the emitter circuit of Q1. It will be noted that if the terminals 96 are incorrectly connected, diode D3 prevents the application of incorrect potentials to the transistors Q1 and Q2.

The described circuit the capacitor C1 charges to a positive voltage determined by the Zener diode Z1 and at a rate determined by the RC time constant of the capacitor and resistors R3, R4 and P1. When capacitor C1 reaches a voltage corresponding to $Vp$ or $WXVz$, transistor Q2 fires. Since $W$ is between 0.55 and 0.82, $Vz$ can be any value between 8.2 and 10 volts to provide a $Vp$ between 4.5 volts and 8.2 volts, which is well within the range of voltages supplied by the average vehicle or engine battery system.

Transistor Q2 on firing enables capacitor C1 to discharge through resistors R2 and R1 at a rate determined by the time constant of the circuit and fire transistor Q1. Capacitor C2 will discharge until Q1 terminates conduction, when its emitter circuit reaches $Vv$, generally in the range of 2.7 to 2.3 volts. The time period for charging and discharging capacitor C1 thus depends on $Vp$ and $Vv$ and is selected at 3.6 seconds. Transistor Q1 on conducting energizes the solenoid coil 36 and since the solenoid responds to pulses as short as 15 milliseconds with, for example, as little as 7 volts thereacross to attract the balanced armature 56 and rotate actuator 60 in a clockwise direction as seen in FIG. 6, the need for pulse stretching circuit is avoided. The lightweight plastic actuator 60 rotates to disengage tooth 66 from between the teeth of the gear or star wheel 70 and engage tooth 68 between the teeth for driving the star wheel one increment and advance the dials 18 correspondingly.

As capacitor C1 discharges, Q2 ceases conduction to in turn cut off transistor Q1. Transistor Q1 deenergizes the coil 36 and actuator 60 returns to normal with tooth 66 thereafter preventing inadvertent rotation of the wheel 70 and dials 18. Diode D4 prevents any voltage spike from being applied to transistor Q1, while capacitor C2 bypasses transients. Diodes D1 and D2 provide temperature compensation for the unijunction Q2 since they have a temperature coefficient inverse to that of Q2.

We claim:

1. An hour meter comprising a housing having a cavity, a pair of spaced plates in said cavity with only one of said plates formed of a magnetically susceptible material, a plurality of axially spaced dials and gears rotatably supported between said plates and adapted to be incrementally rotated for indicating elapsed time, a coil having a pole piece of magnetically susceptible material extending therefrom and fixed at opposite ends to each of said plates for supporting said coil between said plates with said coil spaced adjacent said one plate of magnetically susceptible material and spaced from the other plate of nonmagnetic material, a balanced armature rotatably supported between said plates for rotation about an axis extending between said plates with said armature spaced axially between said coil and said other plate whereby said armature is adapted to rotate toward said pole piece on energization of said coil, means completing magnetic circuit through said armature and through one plate to said coil in response to energization of said coil for rotating said armature in one direction, means biasing said armature from said pole piece for rotating said armature in the opposite direction in response to deenergization of said coil, a plastic actuator having one end secured to said armature with an opening in said actuator adjacent the opposite end of said actuator and encircling one of said gears, said actuator pivoted in respective directions in response to rotation of said armature, a pair of spaced teeth integrally formed on said actuator and projecting into said opening with one of said teeth engaging said one gear in response to rotation of said armature in said one direction for incrementally advancing said dials and the other tooth engaging said one gear for holding said dials stationary in response to rotation of said armature in the other direction, and a solid-state timing circuit fixed to said plates and adapted to periodically energize said coil.

2. An hour meter comprising a housing having a cavity, a pair of spaced plates in said cavity, a plurality of axially spaced dials and gears rotatably supported between said plates and adapted to be incrementally rotated for indicating elapsed time, a coil having a pole piece of magnetically susceptible material extending therefrom for supporting said coil between said plates with only one of said plates being of magnetically susceptible material, said coil having one end spaced adjacent said one plate and the other end spaced from the other plate, a balanced armature rotatably supported between said plates for rotation about an axis extending between said plates with said armature spaced axially between said other coil end and said other plate whereby said armature is adapted to rotate toward said pole piece on energization of said coil, a second pole piece of magnetically susceptible material extending between said plates for rigidly spacing said plates and adapted to complete a magnetic circuit between said armature and said one plate in response to energization of said coil, means biasing said armature from said pole pieces, a plastic actuator pivoted in response to rotation of said armature for incrementally advancing said dials, a solid-state timing circuit fixed to said plates and adapted to periodically energize said coil for rotating said armature and incrementally advancing said dials, and means including said second pole piece for locating and fixing said plates in said cavity and extending electrical connections to said timing circuit from external said housing.

3. An hour meter of the type including a housing having a cavity in which a pair of spaced plates are provided for supporting a plurality of axially spaced dials and gears each adapted to be incrementally rotated for indicating elapsed time, the improvement comprising a coil having a pole piece of magnetically susceptible material extending axially therefrom for supporting said coil between said plates with only one of said plates being of magnetically susceptible material and said coil having one end spaced adjacent said one plate and the other end spaced from the other plate, an armature rotatably supported between said plates for rotation about an axis extending between said plates and intermediate the armature ends with said armature spaced between said coil other end and said other plate whereby one end of said armature is adapted to rotate toward said pole piece on energization of said coil, a magnetically susceptible pole piece member staked to said plates for spacing said plates and adapted to attract the other end of said armature on energization of said coil, a spring for biasing the ends of said armature from said pole piece and said member respectively, a toothed wheel, a member having a pair of spaced teeth with one tooth normally engaged between the teeth of said wheel for preventing rotation of said wheel and dials and pivoted in response to rotation of said armature to engage the other tooth of said pair between the teeth of said wheel for rotating said wheel to incrementally rotate said dials, and a solid-state timing circuit fixed to said plates and adapted to supply periodic pulses to said coil for periodically energizing said coil.

4. The hour meter claimed in claim 3 in which said timing circuit comprises a unijunction transistor having an emitter circuit and a pair of base circuits, an RC circuit including a capacitor connected to said emitter circuit adapted to develop a potential less than 10 volts for firing said unijunction transistor to provide a discharge path for said capacitor through said emitter circuit and one of said base circuits, a pair of resistors connected in series to said one base circuit whereby the total charge and discharge time for said capacitor is at least 3 seconds, and an NPN transistor having a collector circuit connected in series with said coil and a base circuit connected to the junction of said pair of series resistors for developing an operating potential for said coil of at least 15 milliseconds duration in response to a voltage of less than 10 volts applied to said RC circuit and across said coil.

5. In the hour meter claimed in claim 3 a printed circuit board carrying said timing circuit, a pair of threaded studs fixed to said board adjacent one end of each stud and having locating means adjacent the other end of each stud with said studs adapted to fix said board and plates in said cavity and extend electrical potentials to said circuit and coil from external said housing, and guide means integrally formed in said cavity for cooperating with said locating means to position said board and plates in said cavity.

6. The hour meter claimed in claim 3 in which said second pole piece member has a locating lip formed thereon, and guide means integrally formed in said cavity for cooperation with said lip for avoiding movement of said board and plates in any but one direction.

7. A timing circuit for use with a two terminal source of potential ranging between 10 and 15 volts for operating an hour meter including a series of dials adapted to be incrementally rotated for indicating elapsed time, the improvement comprising a unijunction transistor having an emitter circuit and a pair of base circuits, a coil having one terminal connected to one terminal of said source, an RC circuit including a capacitor connected to said emitter circuit and to the other terminal of said source of potential and only a plurality of resistors connected between said emitter circuit and said one coil terminal to develop a potential less than 10 volts for firing said unijunction transistor, a Zener diode connected in shunt with said RC circuit to limit the potential applied to said capacitor, a discharge path for said capacitor through said emitter circuit and one of said base circuits with said discharge path including a pair of resistors serially connected between said one base circuit and the other terminal of said source whereby the total charge and discharge time for said capacitor is at least 3½ seconds, a pair of diodes connected in series between the other base circuit of said unijunction and said one coil terminal with said diodes having a temperature characteristic inverse to the temperature characteristic of said unijunction, means operated in response to energization of said coil for at least 15 milliseconds at either 7 volts or more for incrementally rotating said dials, and an NPN transistor having a collector circuit connected to the other terminal of said coil with the emitter circuit of said NPN transistor connected to said other terminal of said source and a base circuit connected to the junction of said pair of series resistors for developing an operating potential for said coil of at least 15 milliseconds duration in response to a voltage of less that 10 volts applied to said RC circuit and across said coil.